Aug. 31, 1948.   B. WASKO ET AL   2,448,477
MAGNETIC DAMPENER FOR MEASURING INSTRUMENTS
Filed May 23, 1946   2 Sheets-Sheet 1

INVENTORS
BERNARD WASKO
BY JOHN KISTINGER
Campbell Brumbaugh & Free
their ATTORNEYS.

INVENTORS
BERNARD WASKO
BY JOHN KISTINGER
their ATTORNEYS.

Patented Aug. 31, 1948

2,448,477

UNITED STATES PATENT OFFICE 2,448,477

MAGNETIC DAMPENER FOR MEASURING INSTRUMENTS

Bernard Wasko, Philadelphia, Pa., and John Kistinger, New Rochelle, N. Y., assignors to Voland and Sons, Inc., New Rochelle, N. Y., a corporation of New York Application May 23, 1946, Serial No. 671,878

8 Claims. (Cl. 73—430)

This invention relates to improvements in magnetic dampeners for measuring instruments, and it relates particularly to devices for dampening the movement of movable elements of measuring instruments such as, for example, the balance beam of an analytical balance, an indicator pointer of an electrical measuring instrument and the like.

An object of the invention is to provide a simplified form of dampener for the movable elements of a measuring instrument which is adjustable to provide different dampening effects ranging from a strong dampening effect to no dampening effect.

Another object of the invention is to provide a magnetic dampener for measuring instruments which is easily adjustable to produce a preselected dampening effect.

Other objects of the invention will become apparent from the following description of a typical form of dampener embodying the present invention.

In accordance with the present invention, a magnetic dampener is provided which includes two opposed C-shaped or horse shoe magnets which are adjustably mounted on the casing of the measuring instrument or other support conveniently located therein. The magnets are arranged to define air gaps between their poles for receiving a dampener plate which may be fixed to and movable with the movable element, the motion of which is to be dampened. The magnets are movable toward and away from the dampening plate so that the extent of overlap of the magnets and the plate, or the entry of the dampening plate into the air gap may be adjusted to give a variable dampening effect.

Preferably, the magnets are mounted upon a common supporting member which is guided so that the dampening plate is centered with respect to the air gaps between the magnet poles.

Through the use of two magnets located in such positions that their opposite poles are in opposed spaced relationship, a very strong maximum dampening effect can be obtained when maximum overlap of the magnets and the dampening plate is attained. Inasmuch as maximum dampening is not desirable at all times, and frequently dampening is not desired, the adjustment of the magnets relatively to the dampening plate makes possible the selection of the other dampening actions. Adjustment of the dampener for a desired dampening action is facilitated by the provision of a scale on the dampening plate.

For a better understanding of the present invention, reference may be had to the accompanying drawings in which.

Figure 2:
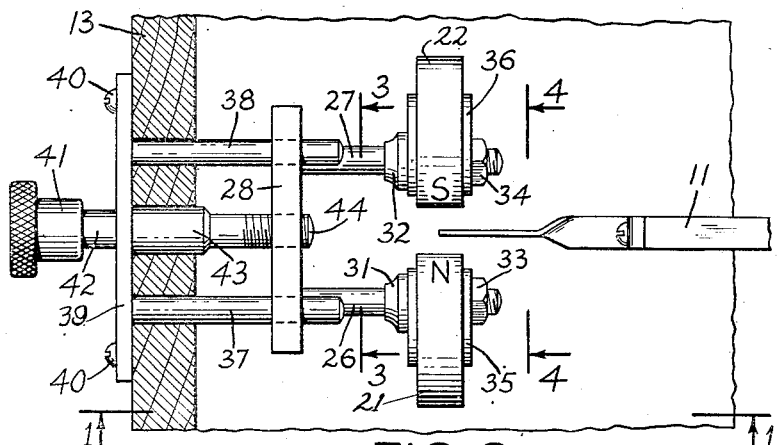
Figure 2 is a plan view of the magnetic dampener disclosed in Figure 1 with only a portion of the balance disclosed.

Magnetic dampeners of the type embodying the present invention may be applied readily to various types of measuring instruments such as, for example, analytical balances, weighing scales, electrical indicating devices and the like. For purposes of illustration, a preferred form of the magnetic dampener is disclosed herein as applied to an analytical balance. Inasmuch as the analytical balance may be of any conventional type, only those portions of the balance are disclosed in the drawings which are essential to the explanation of the device.

Figure 1:
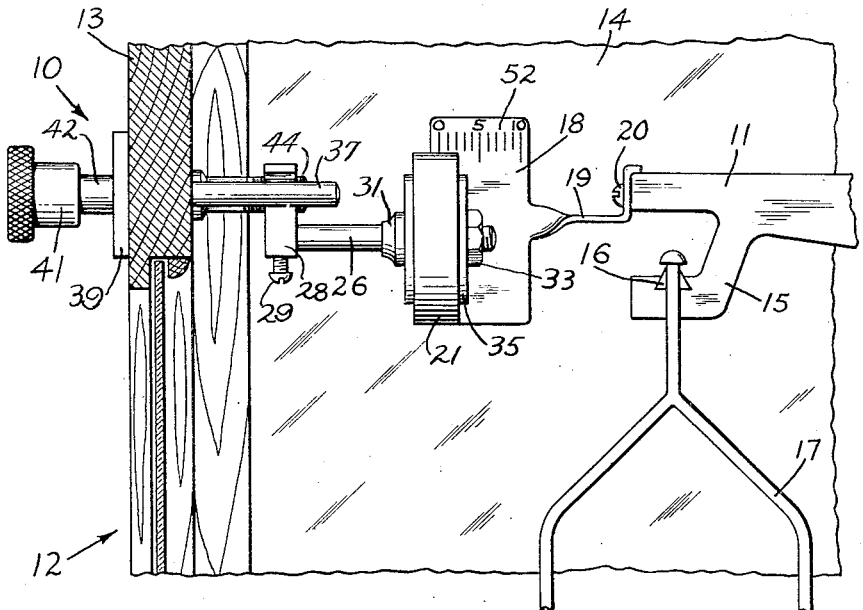
Figure 1 is a view in side elevation of a typical form of dampener as applied to an analytical balance, only a portion of the balance being disclosed.

Referring now to Figures 1 and 2, the dampening device may be applied to an analytical balance 10 having a pivotally mounted balance beam 11 of conventional type which is fulcrumed on a standard, not shown, in the balance case 12. The balance case has opposite end panels 13, only one of which is shown, and front and back closures 14, the back closure, only, being illustrated in Figure 1. The balance case or cabinet 12 may be of any desired type and may be formed of wood, metal or the like having conventional transparent panes therein for viewing the elements of the balance.

As shown, the balance beam 11 is provided with a dropped arm 15 provided with a fulcrum 16 for receiving the usual scale pan hanger 17.

In this form of the invention, the end of the balance beam 11 is provided with a dampening plate 18 of generally rectangular shape which is secured to the end of the beam 11 by means of an arm 19 projecting from the plate 18 and a screw 20. The dampener plate 18 is arranged in a vertical plane in or parallel with the plane of movement of the balance beam 11.

Figure 4:
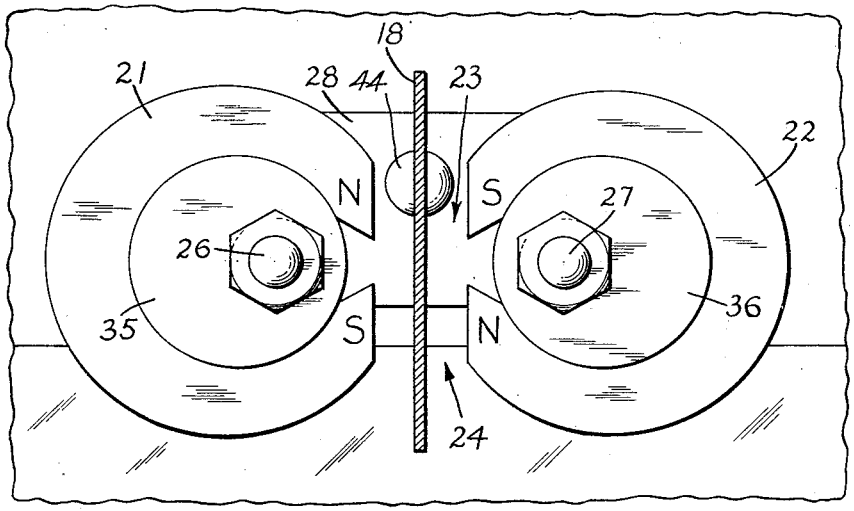
Figure 4 is a view in section taken on line 4—4 of Figure 2.

The magnetic elements providing the dampening action may consist, as best shown in Figure 4, of a pair of C-shaped or horse shoe magnets 21 and 22 which are mounted with their opposite poles in spaced apart opposed relationship to form a pair of air gaps 23 and 24 in alignment with the dampening plate 18 so that the plate 18 may move freely up and down in these air gaps.

Inasmuch as two magnets are used, a very strong dampening effect can be provided, particularly when the magnets are formed of strongly magnetic alloys such as the magnetic aluminum, nickel and cobalt alloys commonly known as "Alnico." The magnets 21 and 22 do not need to be formed of such alloys and, if desired, they may be formed of magnetized iron or the like.

Figure 3:
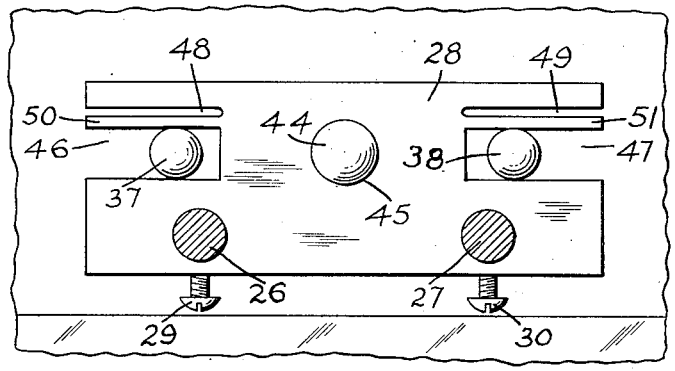
Figure 3 is a view in section taken on line 3—3 of Figure 2.

As shown in Figures 1, 2, and 3, the magnets 21 and 22 are mounted on the rods 26 and 27, respectively, which have their outer ends mounted in a cross bar 28. The ends of the rods 26 and 27 may be received in holes extending through the cross bar 28 and are fixed in relationship to the cross bar by means of the set screws 29 and 30, respectively, which may be loosened to permit adjustment of the rods axially with respect to the cross bar 28.

The magnets are retained on the inner ends of the rods 26 and 27 by means of shoulder elements 31 and 32, respectively, the nuts 33 and 34 and suitable retaining washers 35 and 36.

Inasmuch as it is desirable to vary the dampening effect of the dampener, the cross bar 28 is slidably supported upon a pair of pins or rods 37 and 38 which may be fixed at their outer ends to a plate member 39 which may be secured to the end wall 13 of the casing or cabinet 12. The rods 37 and 38 extending through the end 13 of the cabinet and the plate may be secured to the cabinet by means of screws 40 or the like. Adjustment of the cross bar 28 along the rods 37 and 38 is accomplished by means of a thumb screw or knob 41 which is fixed to the outer end of a shaft 42 that is rotatably mounted in a bushing 43 secured to the plate 39. The rod 42 has a threaded inner end 44 which is threaded into an opening 45 in the cross bar 28 so that upon rotation of the knob 41, the cross bar is adjusted axially of the rods 37 and 38 to cause the magnets to move toward or away from the dampening plate 18. If desired, the rod 42 may be fixed to the cross bar 28 and slidably mounted for axial movement in the bushing 43. In this way, the dampening effect produced by the magnets 21 and 22 and the dampening plate 18 can be varied from zero to a maximum by varying the extent of entry of the dampening plate 18 into the air gaps 23 and 24.

In order to avoid end play or tilting between the cross bar 28 and the guide rods 37 and 38, the cross bar 28 may be provided with recesses 46 and 47 at its opposite ends for receiving the rods 37 and 38, as shown in Figure 3. The ends of the cross bar 28 may be provided with slots 48 and 49 which provide resilient fingers 50 and 51 that resiliently engage the rods 37 and 38. The resilient fingers 50 and 51 permit sliding movement of the cross bar 28 with respect to the guide rods 37 and 38 while preventing tilting of the cross bar 28 and the magnets 21 and 22 supported thereon relatively to the guide rods 37 and 38.

When using the balance under varying conditions, it may be desirable to adjust the dampening action of the dampening device. This can be accomplished with the above described dampening device inasmuch as the magnets can be retracted to such an extent that the dampening plate 18 is disposed entirely outside the air gaps 23 and 24 and no dampening action is obtained. A very strong dampening action can be obtained by adjusting the magnets 21 and 22 inwardly so that the dampening plate 18 is fully within the air gaps.

For reference purposes and to permit easy adjustment of the magnets relatively to the dampening plate to obtain a desired dampening effect, the dampening plate is provided with a scale 52 having scale markings thereon which may be aligned with the edges of the magnets 21 and 22 to indicate the extent of overlap.

It will be understood from the preceding description that the above described dampening device is highly effective when used with analytical balances in which the beam moves in a vertical plane. The device is equally satisfactory for use with other types of measuring or weighing instruments which include a horizontally movable element or in which the magnets must be disposed in front of or behind the movable element because of space requirements. In such devices, the magnets may be arranged to provide air gaps for receiving arcuate rather than flat dampening plates.

Other modifications can be made in the shape and size of the magnets and in the position and dimensions of the other cooperating parts without departing from the invention. Therefore, the form of the invention disclosed herein should be considered illustrative of the invention and not as limiting the scope of the following claims.

We claim:

1. A magnetic dampener for measuring instruments having a movable element, the movement of which is to be dampened, comprising a dampening element fixed to said movable element, a pair of C-shaped magnets, means supporting said magnets for movement toward and away from said movable element and with the poles of one of said magnets in spaced, opposed relationship to the opposite poles of the other magnet to define air gaps for receiving said dampening element, and manually operated means for moving said magnets relatively to said dampening element to vary the extent of entry of said dampening element into said air gaps.

2. A magnetic dampener for a measuring device having a movable element the motion of which is to be dampened, comprising a support adjacent to said movable element, a pair of C-shaped magnets movably mounted on said support with the poles of one magnet in opposed spaced apart relation to the opposite poles of the other magnet to define a pair of air gaps therebetween, a dampening element mounted on said movable element in alignment with said air gaps, and manually operable means for moving said magnets relatively to said dampening element to adjust the latter relatively to said air gaps.

3. A magnetic dampener for measuring instruments having a movable element the movement of which is to be dampened, comprising a support adjacent to said element, guide elements thereon extending toward said movable element, a pair of C-shaped magnets supported on said guide elements for simultaneous movement relative to said movable element, one of said magnets having its poles in opposed, spaced relation to the opposite poles of the other magnet to define a pair of air gaps therebetween, a manually operated member connected to said magnets for moving them relative to said movable element, and a dampening plate fixed to said movable element in alignment with said air gaps for variable entry into said air gaps.

4. A magnetic dampener for measuring instruments having a movable member, the movement of which is to be dampened, comprising a dampening plate fixed to said movable element, a supporting member adjacent to said movable element, a pair of guide elements extending from said support toward said dampening plate, a cross bar slidably mounted on said guide elements for movement toward and away from said dampening plate, a pair of horse shoe magnets mounted on said cross bar with their opposite poles in opposed, spaced apart relation to define air gaps for receiving said dampening plate, and rotatable means engaging said cross bar for moving said cross bar toward and away from said dampening plate.

5. A magnetic dampener for measuring instruments having a movable member, the movement of which is to be dampened, comprising a dampening plate fixed to said movable element, a supporting member adjacent to said movable element, a pair of guide elements extending from said support toward said dampening plate, a cross bar slidably mounted on said guide elements for movement toward and away from said dampening plate, a pair of horse shoe magnets mounted on said cross bar with their opposite poles in opposed, spaced apart relation to define air gaps for receiving said dampening plate, rotatable means engaging said cross bar for moving said cross bar toward and away from said dampening plate, and a scale on said dampening plate for indicating the relative positions of said magnets and said dampening plate.

6. A magnetic dampener for measuring instruments having a movable member, the movement of which is to be dampened, comprising a dampening plate fixed to said movable element, a supporting member adjacent to said movable element, a pair of guide elements extending from said support toward said dampening plate, a cross bar slidably mounted on said guide elements for movement toward and away from said dampening plate, resilient means on said cross bar engaging said guide elements for reducing play between said cross bar and said guide elements, a pair of horse shoe magnets mounted on said cross bar with their opposite poles in opposed, spaced apart relation to define air gaps for receiving said dampening plate, and rotatable means engaging said cross bar for moving said cross bar toward and away from said dampening plate.

7. A magnetic dampener for weighing devices having a casing enclosing a balance beam, the movement of which is to be dampened, comprising a substantially flat dampening plate fixed to and projecting from one end of said balance beam, said plate lying in a substantially vertical plane, a pair of guide elements on said casing projecting substantially horizontally toward said dampening plate, a cross bar slidably mounted on said guide elements, means including a knob on the exterior of said casing connected to said cross bar for sliding the latter along said guide elements, and a pair of horse shoe magnets mounted on said cross bar having their opposite poles in opposed, spaced apart relation to form vertically aligned air gaps for receiving said dampening plate.

8. A magnetic dampener for weighing devices having a casing receiving a balance beam, the movement of which is to be dampened, comprising a substantially flat dampening plate fixed to and projecting from one end of said balance beam, said plate lying in a substantially vertical plane, a pair of guide elements on said casing projecting substantially horizontally toward said dampening plate, a cross bar slidably mounted on said guide elements, means including a knob on the exterior of said casing connected to said cross bar for sliding the latter along said guide elements, a pair of horse shoe magnets mounted on said cross bar having their opposite poles in opposed, spaced apart relation to form vertically aligned air gaps for receiving said dampening plate, and a scale on said dampening plate for indicating the extent of entry of said dampening plate into said air gaps.

BERNARD WASKO.
JOHN KISTINGER.

REFERENCES CITED

The following references are of record in the file of this patent:

UNITED STATES PATENTS

| Number | Name | Date |
| --- | --- | --- |
| 1,997,636 | Gattoni | Apr. 16, 1935 |
| 2,035,318 | Abramson | Mar. 10, 1936 |
| 2,081,252 | Seederer | May 25, 1937 |
| 2,353,617 | Lamb | July 11, 1944 |

Certificate of Correction

August 31, 1948.

Patent No. 2,448,477.

BERNARD WASKO ET AL.

It is hereby certified that error appears in the printed specification of the above numbered patent requiring correction as follows: Column 6, line 48, list of references cited, for the patent number "2,035,318" read *2,033,318*; and that the said Letters Patent should be read with this correction therein that the same may conform to the record of the case in the Patent Office.

Signed and sealed this 9th day of November, A. D. 1948.

[SEAL]

THOMAS F. MURPHY,
*Assistant Commissioner of Patents.*